US005640520A

United States Patent [19]

Tetrick

[11] Patent Number: 5,640,520
[45] Date of Patent: Jun. 17, 1997

[54] MECHANISM FOR SUPPORTING OUT-OF-ORDER SERVICE OF BUS REQUESTS WITH IN-ORDER ONLY REQUESTERS DEVICES

[75] Inventor: R. Scott Tetrick, Portland, Oreg.

[73] Assignee: Intel Corporation, Santa Clara, Calif.

[21] Appl. No.: 431,431

[22] Filed: May 1, 1995

[51] Int. Cl.$^6$ ........................................ G06F 13/14
[52] U.S. Cl. ................................ 395/293; 395/308
[58] Field of Search ........................... 395/306, 308, 395/309, 293, 298, 287

[56] References Cited

U.S. PATENT DOCUMENTS

| | | | |
|---|---|---|---|
| 5,359,715 | 10/1994 | Heil et al. | 395/308 |
| 5,367,695 | 11/1994 | Narad et al. | 395/800 |
| 5,467,295 | 11/1995 | Young et al. | 395/200.05 |
| 5,535,340 | 7/1996 | Bell et al. | 395/292 |

*Primary Examiner*—Glenn A. Auve
*Attorney, Agent, or Firm*—Blakely, Sokoloff, Taylor & Zafman

[57] ABSTRACT

An arbiter for the local bus of a computer system. The system contains a bridge and a plurality of agent devices that are all connected to a local bus. The bridge links the local system to a remote system. The bridge and one of the agents (DEFER agent) within the local system can communicate in correspondence with the Non-uniform memory access (NUMA) standard. The local system also contains an agent (DEFERless agent) that does not comply with the NUMA standard. The arbiter provides access to the local bus in response to a request from one of the agents on a corresponding bus access signal line. If the DEFERless agent generates a remote access request and the bridge cannot immediately service the request, the bridge provides a negative acknowledge to the agent and disables the DEFERless agent bus access signal so that the DEFERless agent cannot control the local bus. The remaining agents can access the local bus even when the DEFERless agent is waiting for service from the bridge. The bridge enables the bus access signal of the DEFERless agent when the bridge can serve a remote access request.

16 Claims, 3 Drawing Sheets

MECHANISM FOR SUPPORTING OUT-OF-ORDER SERVICE OF BUS REQUESTS WITH IN-ORDER ONLY REQUESTERS DEVICES

BACKGROUND OF THE INVENTION

1. Field of the Invention

The present invention relates to an arbiter for the local bus of a computer network.

2. Description of Related Art

Computers are sometimes coupled together within a network such as a local area network (LAN), a wide area network (WAN) and/or a metropolitan area network (MAN). Networks allow computer systems to communicate with each other and improve the utility of the computer.

FIG. 1 shows one type of computer network. The network contains a pair of remote local busses coupled together by a communication link and a pair of bridges. The local busses contain various agent devices such as memory and a microprocessor. The agent of one local bus may request access to an agent located on the other local bus. For example, the microprocessor of one local system may request access to memory space that resides within a memory device located in a remote system.

There have been developed various standards and protocols for network systems, including a standard for remotely accessing memory commonly referred to as the Non-uniform memory access(NUMA) system. NUMA systems typically employ destination queuing (commonly referred to as DEFER) or source queuing (NACK). To access a remote memory device in a NUMA system, the requesting agent generates a memory access request that is transmitted to the bridge on the local bus. The memory access request is retransmitted by the bridge to the remote system. If the requesting agent supports DEFER, the bridge will send a DEFER response to the agent which releases the local bus for further use. Meanwhile the remote bridge performs the requested transaction on the targeted local bus. The requested transaction is relayed back to the originating system through the bridges. A DEFER REPLY is provided to the requesting agent to complete the transaction.

Not all agents are NUMA or DEFER compatible. Placing a DEFERless agent within a NUMA system may reduce the efficiency of the agents within the local system. For example, when a DEFERless agents generates a memory access request and the bridge is unable to immediately service the request, the bridge typically responds with a negative acknowledge (NACK). The DEFERless agent then resubmits another access request. The cycle of access requests and NACK responses may continue for a significant amount of time, thereby tying up access to the local bus and hindering operation of the remaining local agents. It would be desirable to provide a NUMA based computer network which can efficiently accommodate a non-NUMA agent.

SUMMARY OF THE INVENTION

The present invention is an arbiter for the local bus of a computer system. The system contains a bridge and a plurality of agent devices that are all connected to a local bus. The bridge links the local system to a remote system. The bridge and one of the agents (DEFER agent) within the local system can communicate in correspondence with the Non-uniform memory access(NUMA) standard. The local system also contains an agent (DEFERless agent) that does not comply with the NUMA standard. The arbiter provides access to the local bus in response to a request from one of the agents on a corresponding bus access signal line. If the DEFERless agent generates a remote access request and the bridge cannot immediately service the request, the bridge provides a negative acknowledge to the agent and disables the DEFERless agent bus access signal so that the DEFERless agent cannot control the local bus. The remaining agents can access the local bus even when the DEFERless agent is waiting for service from the bridge. The bridge enables the bus access signal of the DEFERless agent when the bridge can serve a remote access request.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
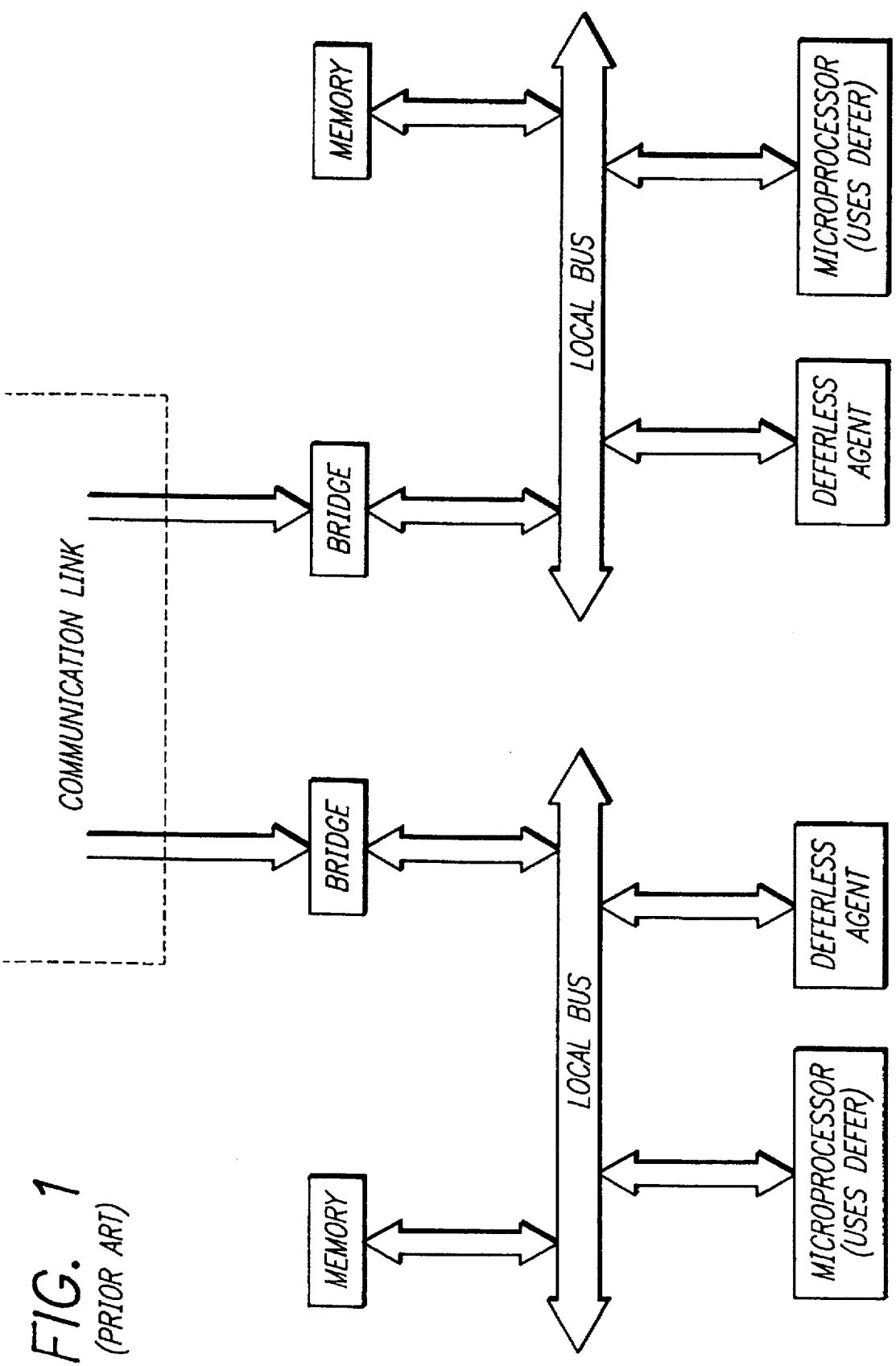
FIG. 1 is a schematic of a computer network of the prior art.
Figure 2:
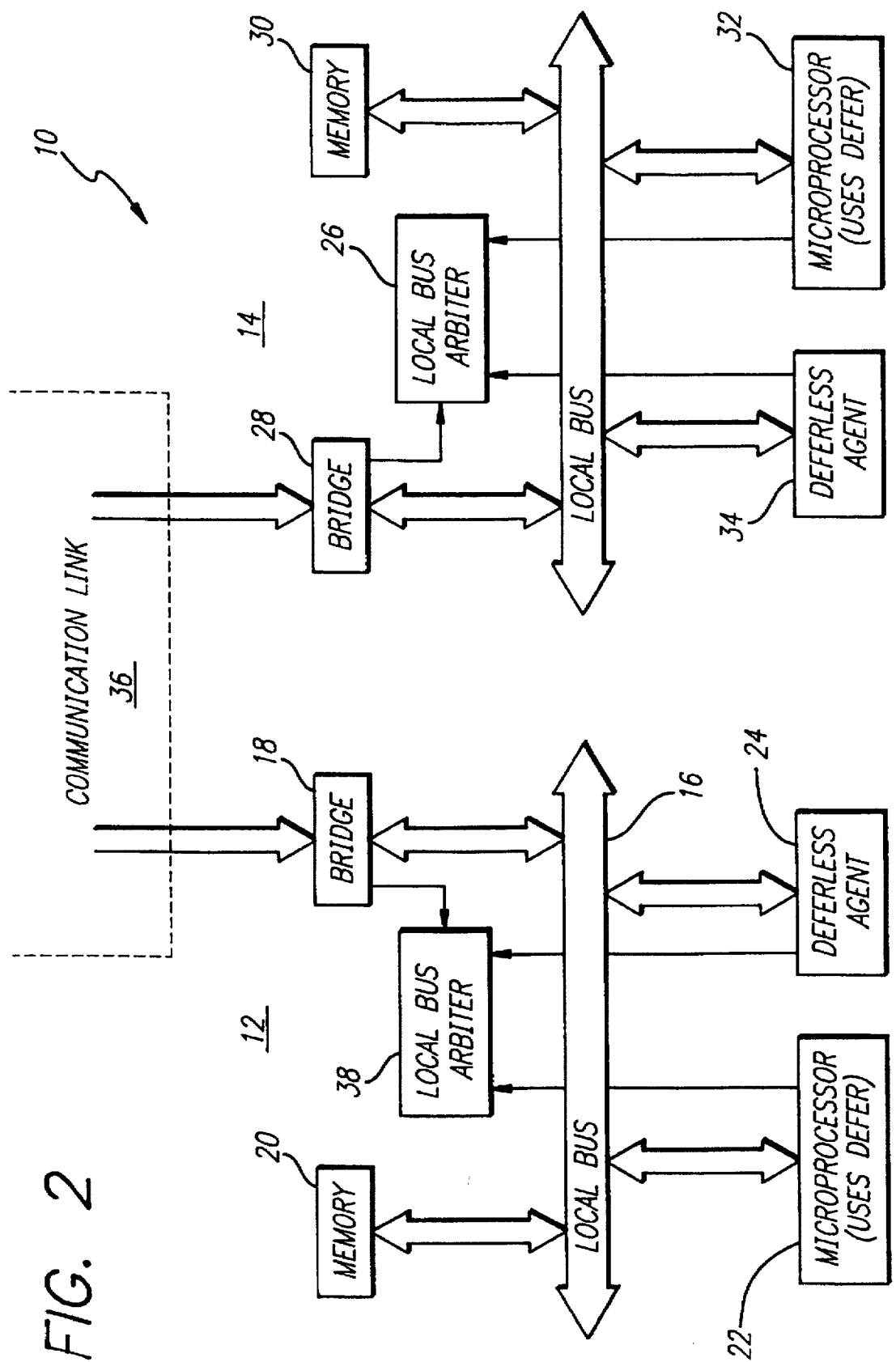
FIG. 2 is a schematic of a computer network of the present invention.

Referring to the drawings more particularly by reference numbers, FIG. 2 shows a computer network 10 of the present invention. The system contains a first local system 12 and a second local system 14. The first local system 12 has a first local bus 16 that couples a first bridge 18 to a plurality of first agent devices 20–24. The second local system 14 has a second local bus 26 that couples a second bridge 28 to a plurality of second agent devices 30–34.

The local systems 12 and 14 can communicate through a communication link 36 that is connected to the first 18 and second 28 bridges. The bridges 18 and 28 typically contain hardware and associated software to transmit and receive information from the agents within the local system. Each bridge also has hardware and associated software to communicate with the bridge of another local system. Although two local systems are shown and described, it is to be understood that additional local systems can be connected to the network of the present invention.

By way of example, agents 20 and 30 may be memory devices. Agents 22 and 32 may be microprocessors that conform to the DEFER protocol of the Non-uniform memory access(NUMA) standard. Agents 24 and 34 may be either a microprocessor or an I/O device that is not compatible with the DEFER protocol (DEFERless).

Figure 3:
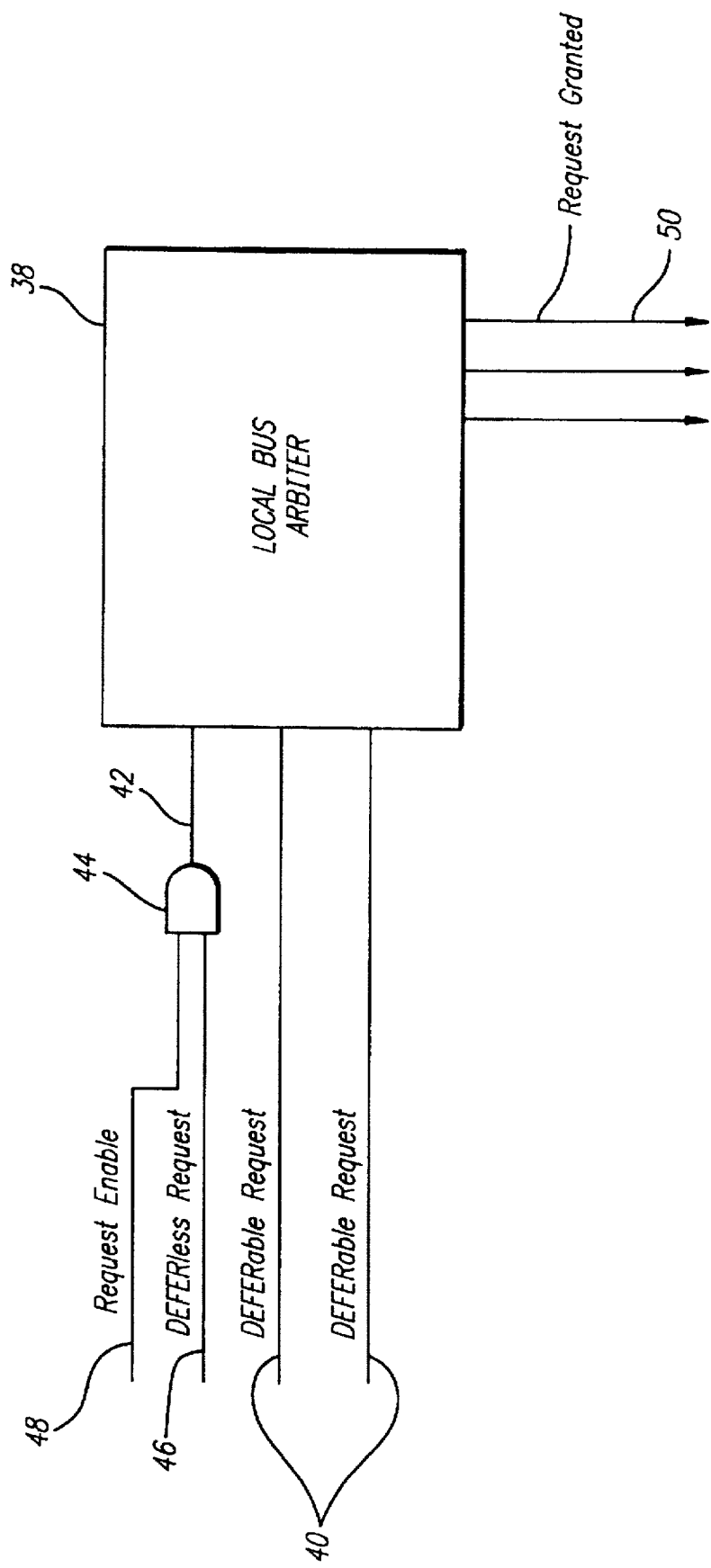
FIG. 3 is a schematic of an arbiter of the present invention.

Attached to the local busses 16 and 26 are local bus arbiters 38. The arbiters 38 control agent access to the local busses. As shown in FIG. 3, each arbiter 38 has a plurality of DEFERable input request lines 40 that are connected to the agents that are DEFER compatible. The arbiter 38 is also connected to the output line 42 of an AND gate 44. One of the AND gate 44 input pins is a DEFERless request line 46 connected to an agent that is not DEFER compatible. The other AND gate 44 input pin is a Request Enable line 48 that is connected to the bridge.

The arbiter 38 also has a plurality of Request Granted output lines 50 that are connected to the agents of the system. To transfer information on the local bus, an agent must first provide a request signal to the aribiter for bus access. If the bus is not occupied, the arbiter will provide an access granted signal back to the agent, wherein the agent will proceed to transfer information onto the local bus. The arbiter 38 will typically provide access to the bus on a first-in first-out basis.

When the bridge is available to service a request from an agent, a binary 1 is provided to the Request Enable pin of the AND gate 44. If the DEFERless agent generates a bus access request on the DEFERless line, the AND gate 44 will provide a binary 1 output to the arbiter 38 which will provide bus access to the DEFERless agent if the bus is not occupied. If the bridge is unable to service a request from an agent, a binary 0 is provided to the Request Enable pin of the AND gate. The binary 0 input maintains the AND gate output at a binary 0 state, so that the DEFERless agent cannot obtain access to the local bus. The bridge can therefore control the bus access of the DEFERless agent and prevent the DEFERless agent from "locking" the local bus through a cycle of continuously requesting access to the bus. Although an AND gate is shown and described, it is to be understood that other logic may be employed to allow the bridge to control the bus access of the DEFERless agent.

By way of example, in operation the DEFER microprocessor 22 of the first local system may request a memory access. The processor 22 initially submits a bus access request to the aribiter 38 on the DEFERable request line to access the first local bus 16. If the first local bus 16 is not occupied the arbiter 38 generates a Request Granted signal and provides access to the bus. The processor 22 then transmits the memory access request to the first bridge 18. Upon receipt of the memory access request the bridge 18 provides a DEFER response to the processor 22. As a DEFER agent the processor 22 relinquishes control of the local bus by terminating the bus request signal to the arbiter 38. The bridge determines the location of the memory request. If the requested memory addresses reside within the local memory device 20, accessing of the requested memory will subsequently occur. If the bridge 18 determines that the requested memory addresses reside in the second memory device 30, the first bridge 18 transmits the memory access request to the second bridge 28, which routes the request to the memory device 30 of the second system.

The DEFERless agent 24 may also request access to memory addresses that reside in the memory device 30 of the second system 14. The DEFERless agent attempts to gain access to the first local 16 bus by providing a binary 1 on the DEFERless request line 46. The binary 1 is carried through the AND gate 44 and provided to the arbiter 38. The arbiter 38 provides access to the first local bus 16 so that the DEFERless agent can transmit the memory access request to the first bridge 18. The first bridge 18 is unable to service the DEFERless agent memory access request while servicing the DEFER agent access request. The first bridge 18 therefore sends a negative acknowledge (NACK) signal(s) back to the DEFERless agent 24 and changes the state of the Request Enable line 48 of the AND gate 44 to a binary 0. By changing the state of the AND gate 44 input, the bridge 18 blocks any future bus access request from the DEFERless agent 24 to the arbiter 38. The first local bus is available to the other agents in the system, even if the DEFERless agent 24 attempts to retry the remote memory access request.

The first bridge 18 changes the state of the Request Enable line 48 back to a binary 1 when the transaction requested by the DEFER agent 22 has been completed. The DEFERless agent can then resubmit the memory access request by providing a binary 1 on the DEFERless request line 46 of the AND gate 44 and obtaining access to the local bus 16. The present invention allows an agent that is not DEFER compatible to be incorporated within a system that contains agents which are DEFER compatible.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A computer network system, comprising:
    a local bus;
    a bridge that is connected to said local bus and coupled to a remote agent, said bridge receives an agent access request and retransmits said agent access request to the remote agent, said bridge generates an agent disable signal when said agent access request is not retransmitted to the remote agent;
    a first agent that is connected to said local bus, and which generates and transmits a first agent bus access request and a first agent access request;
    a second agent that is connected to said local bus, and which generates and transmits a second agent bus access request and a second agent access request;
    an arbiter that is connected to said local bus, and receives said first and second agent bus access requests and provides said first and second agents access to said local bus; and;
    a bus access logic circuit that disables said second agent bus access request to prevent further second agent bus access requests to said arbiter from said second agent when said agent disable signal is generated by said bridge.

2. The system as recited in claim 1, wherein said bus access logic circuit includes an AND gate that has a first input connected to said second agent bus access request, a second input connected to said bridge agent disable signal, and an output connected to said arbiter.

3. The system as recited in claim 1, wherein said first agent is a microprocessor.

4. The system as recited in claim 3, wherein said second agent is a microprocessor.

5. The system as recited in claim 3, wherein said second agent is an input/output device.

6. A computer network system, comprising:
    a first local bus;
    a first bridge that is connected to said first local bus, said bridge receives an agent access request and retransmits said remote device request, said bridge generates an agent disable signal when said agent access request is not retransmitted;
    a first agent that is connected to said first local bus, and which generates and transmits a first agent bus access request and a first agent access request;
    a second agent that is connected to said first local bus, and which generates and transmits a second agent bus access request and a second agent access request;
    an arbiter that is connected to said first local bus, said arbiter receives said first and second agent bus access requests and provides said first and second agents access to said first local bus;
    a bus access logic circuit that disables said second agent bus access request to prevent further second agent bus access requests to said arbiter from said second agent when said agent disable signal is generated by said bridge;
    a second bridge that is connected to said first bridge;

a second local bus that is connected to said second bridge; and, a remote agent connected to said local bus.

7. The system as recited in claim 6, wherein said bus access logic circuit handles an AND gate that has a first input connected to said second agent bus access request, a second input connected to said bridge agent disable signal, and an output connected to said arbiter.

8. The system as recited in claim 6, wherein said first agent is a microprocessor.

9. The system as recited in claim 8, wherein said second agent is a microprocessor.

10. The system as recited in claim 8, wherein said second agent is an input/output device.

11. A computer network system, comprising:

a local bus;

a bridge that is connected to said local bus and coupled to a remote agent, said bridge receives an agent access request and retransmits said agent access request to the remote agent, said bridge generates an agent disable signal when said agent access request is not retransmitted to the remote agent;

a first agent that is connected to said local bus, and which generates and transmits a first agent bus access request and a first agent access request;

a second agent that is connected to said local bus, and which generates and transmits a second agent bus access request and a second access request;

an arbiter which receives said first and second bus access requests from said first and second agents and provides said first and second agents access to said local bus; and, bus access means for disabling said second agent bus access request to prevent further second agent bus access requests to said arbiter from said second agent when said agent disable signal is generated by said bridge.

12. The system as recited in claim 11, wherein said bus access means includes an AND gate that has a first input connected to said second agent bus access request, a second input connected to said bridge agent disable signal, and an output connected to said arbiter.

13. The system as recited in claim 11, wherein said first agent is a microprocessor.

14. The system as recited in claim 13, wherein said second agent is a microprocessor.

15. The system as recited in claim 13, wherein said second agent is an input/output device.

16. A method for controlling an access request between remote agents, comprising the steps of:

a) sending a bus access request signal from an agent to an arbiter to obtain access to a local bus;

b) sending an agent access request from said agent to a bridge on said local bus;

c) sending a not acknowledge signal from said bridge to said agent; and, d) disabling said bus access request signal to prevent further agent access requests from said agent to said arbiter.

* * * * *

UNITED STATES PATENT AND TRADEMARK OFFICE
CERTIFICATE OF CORRECTION

PATENT NO.    : 5,640,520
DATED         : June 17, 1997
INVENTOR(S)   : R. Scott Tetrick It is certified that error appears in the above-identified patent and that said Letters Patent is hereby corrected as shown below:

In column 5 at line 3 insert --second-- following "said" and prior to "local"

Signed and Sealed this

Twenty-third Day of September, 1997

Attest:

BRUCE LEHMAN

Attesting Officer

Commissioner of Patents and Trademarks